(12) United States Patent
Davern et al.

(10) Patent No.: US 7,174,734 B2
(45) Date of Patent: Feb. 13, 2007

(54) REFRIGERATOR DAMPER WITH PTC HEATER ACTUATION

(75) Inventors: Thomas J. Davern, St. Charles, IL (US); James E. Pearson, Downers Grove, IL (US); Paul H. Tuma, Lombard, IL (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 11/288,621

(22) Filed: Nov. 29, 2005

(65) Prior Publication Data

US 2006/0112704 A1    Jun. 1, 2006

Related U.S. Application Data

(60) Provisional application No. 60/632,319, filed on Nov. 30, 2004.

(51) Int. Cl.
*F25D 17/04*    (2006.01)
*F23N 1/00*    (2006.01)
*G05D 23/02*    (2006.01)

(52) U.S. Cl. .................. 62/187; 236/96; 236/101 R

(58) Field of Classification Search .................. 62/186, 62/187; 236/87, 96, 101 R
See application file for complete search history.

(56) References Cited

U.S. PATENT DOCUMENTS 4,653,283 A    3/1987    Sepso
4,834,169 A *  5/1989    Tershak et al. ............. 165/233

OTHER PUBLICATIONS

Dekko Medical Devices, a Group Dekko Company, Positive Temperature Coefficient (PTC) Heating Technology, Brochure, 2004, 1 page.

* cited by examiner

*Primary Examiner*—Marc Norman
(74) *Attorney, Agent, or Firm*—Reinhart Boerner Van Deuren P.C.

(57) ABSTRACT

A damper in a refrigeration system having a first compartment and a second compartment connectable through a passageway is provided. The damper comprises a damper door, a temperature responsive unit, and a heating element. The damper door is moveable between an open position and a closed position. The temperature responsive unit is operatively coupled to the damper door. The heating element is coupled to one end of the temperature responsive unit to conductively heat the temperature responsive unit when activated. The temperature responsive unit expands to move the damper door to the open position in response to conductive heating from the heating element.

20 Claims, 4 Drawing Sheets

REFRIGERATOR DAMPER WITH PTC HEATER ACTUATION

CROSS-REFERENCE TO RELATED PATENT APPLICATIONS

This patent application claims the benefit of U.S. Provisional Patent Application No. 60/632,319 filed Nov. 30, 2004, the teachings and disclosure of which are hereby incorporated in their entireties by reference thereto.

FIELD OF THE INVENTION

This invention relates generally to a damper control system for a refrigerator, and more particularly to a bellows driven actuator system for a refrigerator.

BACKGROUND OF THE INVENTION

Refrigeration systems, such as those found in typical household appliances, often include a frozen food compartment and a fresh food compartment. The two compartments are interconnected by a passageway that is regulated by a damper having a movable (rotatable, slideable, etc.) damper door. When the temperature in the fresh food compartment rises above a predetermined level, the damper is actuated to open the damper door and permit a lower temperature air from the frozen food compartment to pass through the passageway and into the fresh food compartment. When the temperature in the fresh food compartment has dropped to a desired level, actuation of the damper is discontinued, the damper door is closed, and the passageway between the two compartments is blocked.

The dampers can be actuated in a variety of different ways and the damper doors can be driven using a variety of apparatuses and methods. One type of damper that is known in the art is a motorized damper. The motorized damper operates to open the damper door when a voltage signal is supplied to a solenoid or motor operatively coupled by an actuator to the damper door. With the energized solenoid or motor, the damper door can be transitioned from a closed to an open position. Thereafter, when the voltage is removed, the damper is no longer actuated, and a resilient member such as a spring is able to draw the damper door back into the closed position. To ensure that the door opens and closes at the proper times, the refrigeration system having a motorized damper typically includes a sensor that monitors a temperature in the fresh food compartment and a control device that provides the voltage signal to the damper to drive the damper door to an appropriate position based on this sensed temperature in the fresh food compartment.

While this type of damper control provides rapid actuation of the damper door, it is not very energy efficient. If a significant amount of cooling for the fresh food compartment is needed, such as in warm climates when the refrigerator door is opened many times or held open for long periods by children or others, the amount of energy that is wasted opening and closing the damper door can be significant.

Another example of a damper that is known in the art and that does not suffer from the energy usage issues of the previous type is a bellows or refrigerant damper. This type of damper uses a bellows that is filled with a refrigerant. The bellows are positioned in the fresh food compartment. As the refrigerant expands based on an increase in the ambient temperature in the fresh food compartment, the bellows move an actuator that opens the damper door. As the temperature in the fresh food compartment falls, the refrigerant in the bellows contracts or condenses. As this occurs, the bellows contract to allow the damper door to close. A resilient member, such as a spring, may be used to force the damper door to close as the bellows contract.

To provide a more rapid control, some refrigerant dampers have began to incorporate a heater to cause the bellows to expand quicker when the temperature in the fresh food compartment rises above the set point. In such a system, the refrigerant damper is actuated when a voltage is supplied to a heating element that is coiled around the bellows. The supplied voltage causes the heating element to increase the temperature of the refrigerant within the bellows to expand rapidly. As described above, this causes the bellows to expand and the damper door is moved into an open position. When the voltage is removed from the heater, the ambient air in the compartment causes the temperature of the refrigerant to drop. As a result of the cooling refrigerant, the bellows contract or deflate and, like above, a spring is able to resiliently bias the damper door back into the closed position. Such a system is disclosed in U.S. Pat. No. 4,653,283 to Sepso, entitled REFRIGERATOR SYSTEM, CONTROL DEVICE THEREFOR AND METHODS OF MAKING THE SAME, the teachings and disclosure of which are incorporated herein in their entireties by reference thereto.

Unfortunately, while such a damper system described by the '283 patent provides distinct advantages over the ambient temperature controlled bellows-driver damper system, the placement of the heating element around the bellows presents certain inefficiencies. Specifically, because the bellows must be able to expand and contract without obstruction, the heating element that is coiled therearound must be positioned so at to not interfere with this mechanical movement of the bellows. As such, the heating element must be positioned at least a certain distance from the bellows. The heat transfer from the heating element to the damper bellows, therefore, must occur through the ambient, cool air to affect the refrigerant in the bellows. This results in a less than efficient heat transfer, requires more power to provide actuation of the damper, and unnecessarily delays the actuation thereof. Such problems detract from the performance of this type of damper despite advantages in cost savings and quiet, high-force operation over the electrically actuated damper systems that utilize a motor or solenoid.

Thus, a damper system that can be precisely activated and deactivated with the performance provided by a motor or solenoid type actuator and that can provide a low-cost, efficient, quiet, high-force and reliable actuating force such as that provided by a bellows type actuator that overcomes the problems with each is desirable. The invention provides such a damper system. These and other advantages of the invention, as well as additional inventive features, will be apparent from the description of the invention provided herein.

BRIEF SUMMARY OF THE INVENTION

In view of the above, the present invention provides a new and improved refrigeration damper system that overcomes one or more problems existing in the art. More particularly, the present invention provides a new and improved refrigeration damper system that provides precise, rapid actuation of the damper. Even more particularly, the present invention provides a new and improved refrigeration damper system that provides precise actuation of the damper in a low cost, energy efficient manner. In one embodiment of the present invention, the damper system utilizes a refrigerant filled bellows to actuate the damper.

In one aspect, the invention provides a damper in a refrigeration system having a first compartment and a second compartment connectable through a passageway. The damper comprises a damper door, a temperature responsive unit, and a heating element. The damper door is moveable between an open position and a closed position. The temperature responsive unit is operatively coupled to the damper door. The heating element is coupled to one end of the temperature responsive unit to conductively heat the temperature responsive unit when activated. The temperature responsive unit expands to move the damper door to the open position in response to conductive heating from the heating element.

In another aspect, the invention provides a damper assembly. The damper assembly comprises a housing, a damper door, a temperature responsive unit, a terminal plate, and a resisting heating element. The damper door is disposed in the housing and moveable within the housing between an open and a closed position. The temperature responsive unit is disposed in the housing and has a first end in thermal communication with a back plate and a second end operatively coupled to the damper door. The terminal plate is disposed in the housing and in spaced relation to the back plate. The resistive heating element is disposed in the housing, interposed between and in electrical communication with each of the back plate and the terminal plate, and in thermal communication with the back plate. The temperature responsive unit is operative to move the damper door from the closed position to the open position rapidly upon energization of the resistive heating element.

In yet another aspect, the invention provides a damper in a refrigeration system having a first compartment and a second compartment connectable through a passageway. The damper comprises a housing, a damper door, a gas-charged bellows, a load member, a back plate, and a positive temperature coefficient (PTC) heater. The damper door is disposed in the housing and moveable to open and to close the passageway. The gas-charged bellows is disposed in the housing and adapted to expand when heated. The load member is operatively coupled between the gas-charged bellows and the damper door. The back plate is disposed in the housing and abutting the gas-charged bellows. The PTC heater is in contact with the back plate. The PTC heater conductively heats the gas-charged bellows through the back plate when activated, the gas-charged bellows expands to transition the load member to bias the damper door open, and cold air from the first compartment is permitted to flow into the second compartment through the passageway.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
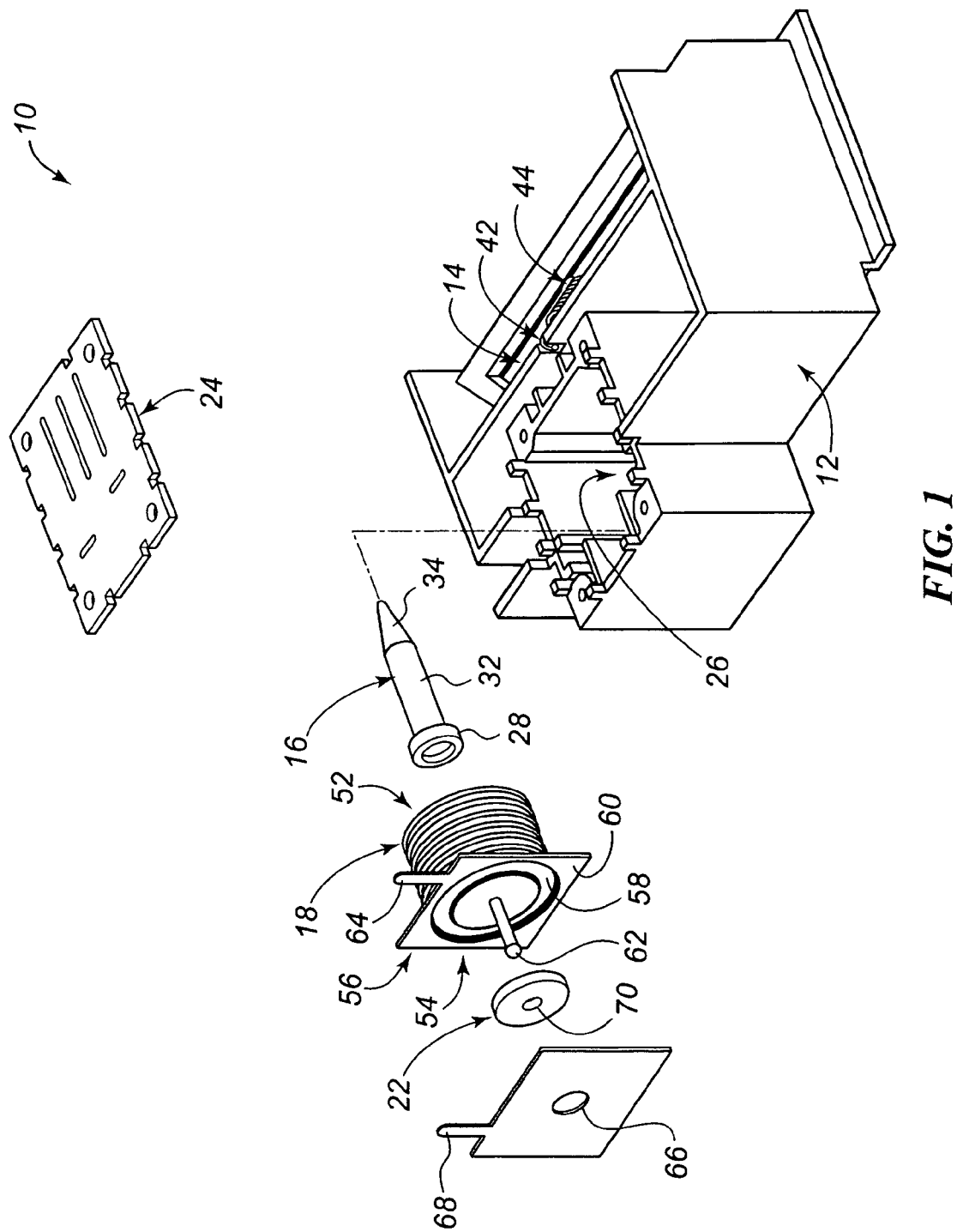
FIG. 1 is an exploded perspective view of an exemplary embodiment of a damper constructed in accordance with the teachings of the present invention.

Referring to FIG. 1, a refrigeration control device typically referred to as a damper 10 is disclosed. As will be more fully explained below, the damper 10 is precisely activated and deactivated and provides a low-cost, efficient, high-force and reliable actuating force. Additionally, the damper 10 operates by using a heater that provides direct conductive heating, is self-regulating, and requires little physical space. The damper 10 comprises a housing 12, a damper door 14, a load member 16, a temperature responsive unit 18, a terminal plate 20, a resistive heating element 22, and a cover 24.

The damper 10 is adapted to be employed within a standard or conventional refrigeration system (not shown). The typical refrigeration system can be found in, for example, a household appliance like a combination refrigerator/freezer. Such a refrigeration system generally includes a first compartment (e.g., a freezer) and a second compartment (e.g., a refrigerator or fresh food compartment) connected by a passageway in which or associated with the damper of the present invention may be installed. When the ambient air in the fresh food compartment is sensed to be above a desired temperature, the damper 10 opens the passageway and permits the colder air from the freezer compartment to flow into the fresh food compartment. When the ambient temperature in the fresh food compartment has sufficiently dropped, the damper closes and stops the flow of colder air.

Figure 2:
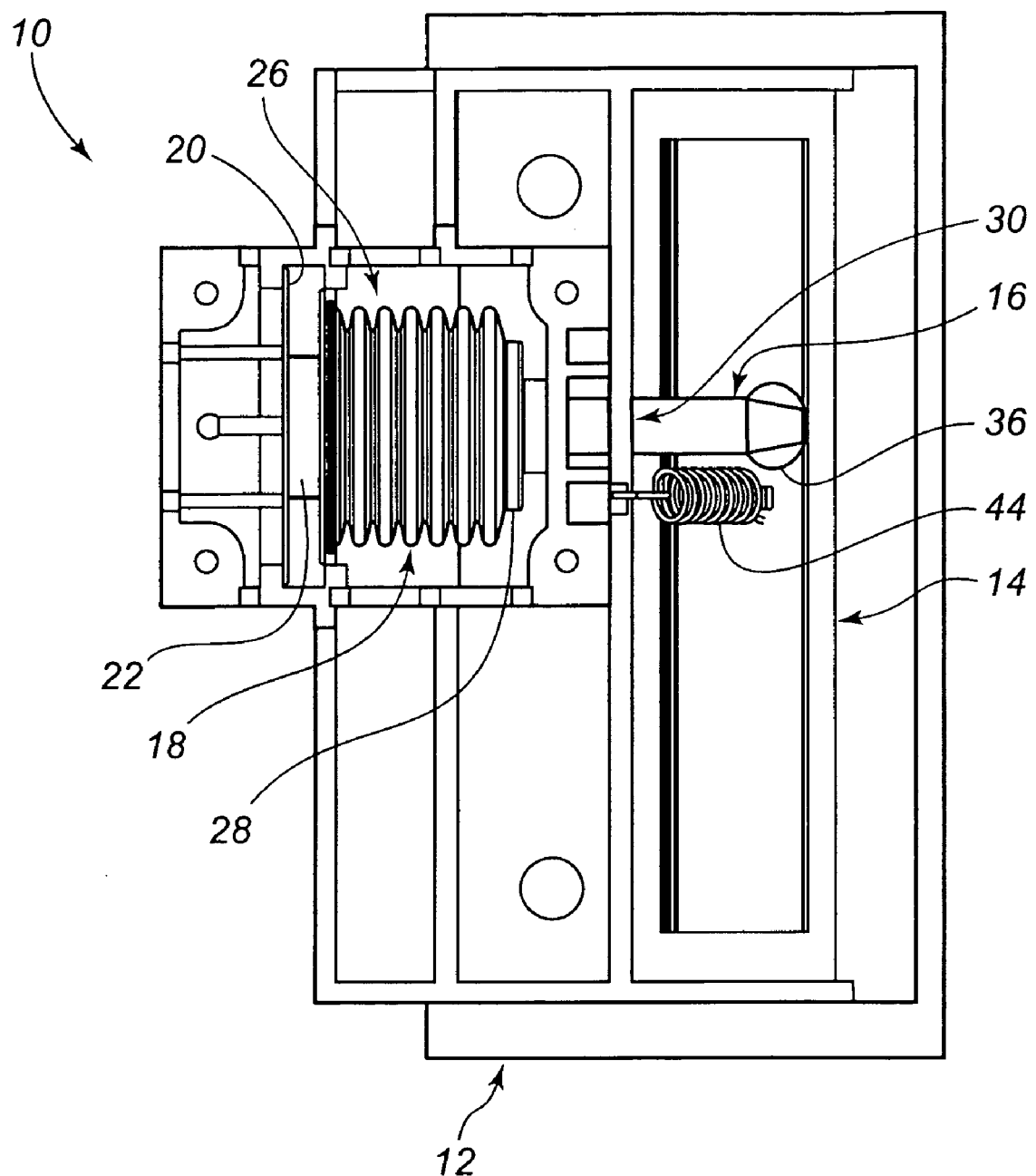
FIG. 2 is a top view of the damper of FIG. 1 with the cover removed.

As shown in FIG. 1, the housing 12 of the damper 10 can be formed or constructed from any suitable material such as, for example, plastic. In a preferred embodiment, the housing 12 provides mechanical support for one or more of the other components and is made of a non-electrically conducting or insulating material. The housing 12 includes a cavity 26 or compartment that is, as illustrated in FIG. 2, sized and dimensioned to receive a rear portion 28 of the load member 16, the temperature responsive unit 18, the terminal plate 20, and the resistive heating element 22 when the damper is assembled. Notably, the cavity 26 is large enough to permit the temperature responsive unit 18 to alternately expand and contract (i.e., inflate and deflate) based on the temperature of the refrigerant therein.

As illustrated in FIG. 2, the housing 12 also includes an aperture 30 dimensioned to receive and support a central portion 32 of the load member 16 to allow for reciprocating movement thereof. A forward portion 34 of the load member 16 extends beyond the aperture 30 and is received within a cup 36 or recess on the damper door 14. As illustrated, the forward portion 34 of the load member 16 is preferably conical in shape. The load member 16 can be a push rod, a piston, a camshaft, and the like.

Figure 3:
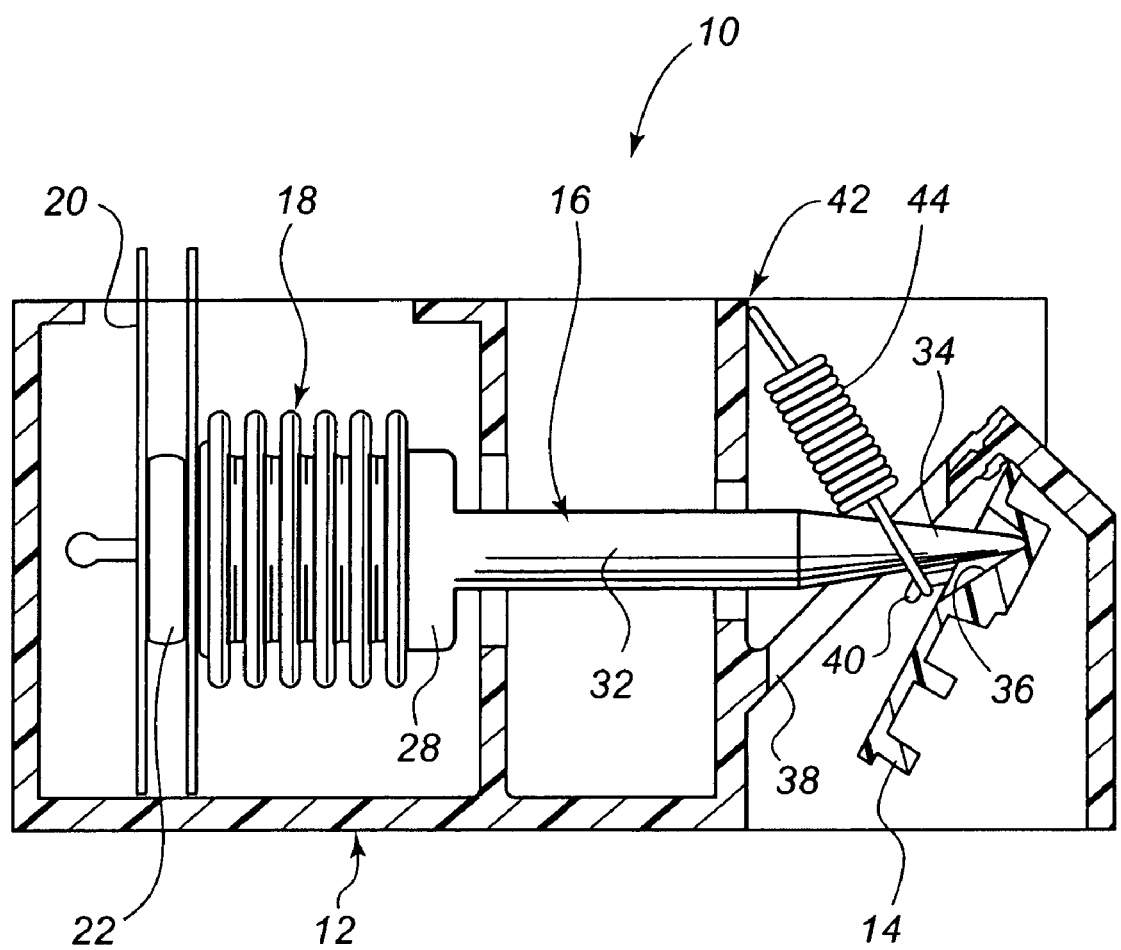
FIG. 3 is a partial cross section view of the damper of FIG. 1 with damper door biased open.

As is well known in the art, at least a portion of the housing 12 is generally placed and/or positioned within the passageway extending between the first and second compartments. As such, the moveable damper door 14 is able to selectively restrict or permit the flow of air between the two compartments. For example, as shown in FIG. 3, when the damper door 14 is disengaged from a seat 38 on the housing 12, the damper 10 permits the flow of air from one compartment to another. In contrast, when the damper door 14 is engages the seat 38 (not shown), the damper 10 restricts the flow of air between the compartments.

The damper door 14 is, in the embodiment illustrated in FIGS. 1–3, a generally planar structure pivotably secured to the housing 12. As may best be seen in FIG. 3, in addition to the cup 36 that receives the forward portion 34 of the load member 14, the damper door 14 further includes a securing structure 40 (e.g., a hook). The housing 12 also includes a securing structure 42 (e.g., a pin). A resilient member 44 (e.g., a spring) is attached between the hook 40 and the pin 42 to provide a sufficient amount of tension to move the damper door 14 and to keep it engaged with the seat 38 on the housing 12 when the refrigerant in the bellows 18 condenses. In one embodiment, the inherently resilient nature of the responsive unit 18 can be relied upon to keep the damper door 14 biased toward and/or engaged with the seat 38.

Figure 4:
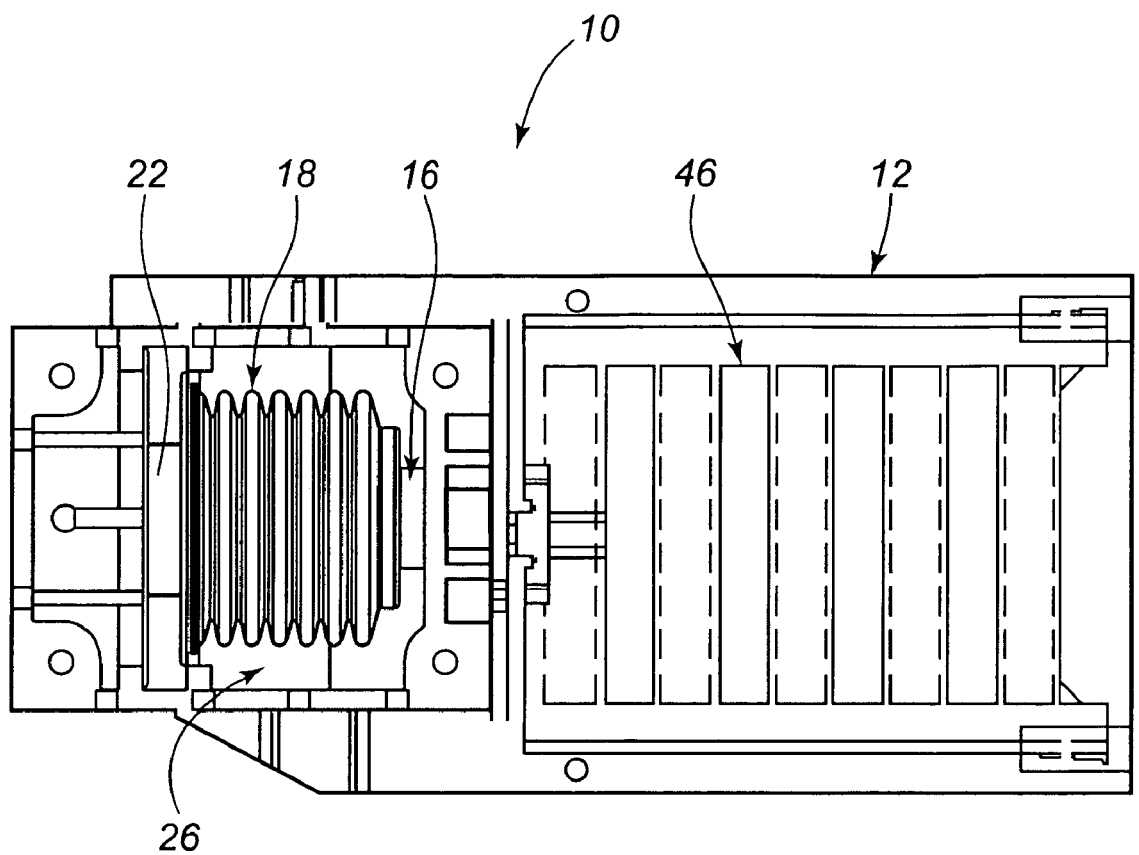
FIG. 4 is a top view of an alternative embodiment of the damper of FIG. 1 where a damper door is slideable relative to a grate.

While the damper door 14 moves by pivoting in the illustrated embodiment of FIGS. 1–3, the damper door can also be slideable. As shown in FIG. 4, the damper 10 can employ a grate type or grate style damper door 46 as well known in the art. In such an embodiment, the damper door 46 includes a first grate 48 that is slideable with respect to a second grate 50. When the first and second grates 48, 50 are slid into alignment, the passageway is opened. In contrast, when the first and second grates 48, 50 are transitioned such that the apertures in each grate are blocked, the passageway is closed. In addition to the damper 10 employing a pivoting damper door 14 or a slideable damper door 46, the damper can also suitably use a rotatable damper door (not shown).

In a preferred embodiment, the temperature responsive unit 18 is employed by the damper 10 to move the damper door 14. In other words, the temperature responsive unit 18 provides the force needed to overcome or counteract the bias exerted by the resilient member 44 on the damper door 14. To do so, a first end 52 (see FIG. 1) of the temperature responsive unit 18 engages with the rear portion 28 of the load member 16 such that the load member 16 exerts a force on the damper door 14. Therefore, movement of the temperature responsive unit 18 toward the damper door 14 as the refrigerant expands is translated to the load member 16 to open the damper door 14.

In the illustrated embodiment, the temperature responsive unit 18 is a gas-charged bellows. The gas-charged bellows are structured to expand and contract in an accordion-like fashion. The temperature responsive unit 18 generally contains or houses a fluid capable of quickly transitioning between gaseous and liquid states. In a preferred embodiment, the fluid in the gas-charged bellows is a refrigerant as is known in the art.

As shown in FIG. 1, the temperature responsive unit 18 is operably coupled at a second end 54 to a back plate 56. In one embodiment, the back plate 56 is a square, generally planar member constructed of an electrically conducting material. In one embodiment, the back plate 56 includes an annular indentation 58 in a back side 60 of the back plate. The annular indentation 58 is used to seat the temperature responsive unit 18 on the back plate 56. The back plate 56 can also include an elongate shaft 62. The back plate 56 includes a terminal 64 that is suitable for receiving an electrical connection.

In the illustrated embodiment, the terminal plate 20 is a square, generally planar member constructed of an electrically conducting material. The terminal plate 20 includes a central aperture 66 adapted to receive the elongate shaft 62 in a non-conductive manner. The terminal plate 20 also includes a terminal 68 that is suitable for receiving an electrical connection.

The heating element 22 is generally disposed between the back plate 56 and the terminal plate 20. In particular, the heating element 22 is positioned at the second end 54 of the temperature response unit 18. The heating element 22 is preferably directly engaged or in contact with the back side 60 of the back plate 56. As such, the heating element 22 is adjacent to and/or proximate the second end 54 of the temperature responsive unit 18 and is advantageously positioned to conductively heat the fluid housed in the temperature response unit in an efficient and effective manner. This provides a significant advantage over prior bellows type actuators that use a heater to actuate the damper.

In a preferred embodiment, the heating element 22 is an electrical heating element. In an exemplary embodiment, the heating element is a positive temperature coefficient (PTC) heating element or heater. A PTC heater, which is sometimes referred to as a ceramic heater, is generally constructed of small, ceramic stones. In particular, materials used to construct the ceramic stones are doped polycrystalline ceramics based on barium titanate. Often, metallized contacts are applied to the surface of the ceramic stone to facilitate electrical conduction after the stone has been formed through processes including blending, milling, drying, and sintering. The shape of the ceramic stones can be square, rectangular, round, annular, a "doughnut" shape, and the like. As shown in FIG. 1, the illustrated embodiment utilizes an annular shaped heating element 22 having a central aperture 70 is employed. The central aperture 70 is dimensioned to passably receive the elongate shaft when the damper 10 is assembled.

The PTC heater is manufactured to achieve a reference temperature. When a voltage is initially applied across the terminals 64, 68, a resistance of the heating element 22 drops permitting a large amount of current to pass through the heating element 22. This large current permits the temperature of the heating element to rise very quickly until the reference temperature is reached. When the reference temperature of the heating element 22 is reached, the temperature plateaus and the heating element 22 automatically becomes self-regulating.

Once the load member 16, the temperature responsive unit 22, the back plate 56, the heating element 22, and terminal plate 20 are assembled and placed in the housing l, the cover 24 is secured to the housing 12. Notably, when the damper 10 is assembled, as shown in FIG. 2, the load member 16, the temperature responsive unit 18, the heating element 22, and the back plate 56 are all preferably axially aligned. Thereafter, a first electrical connection (not shown) is made at the terminal 64 (see FIG. 1) on the back plate 56 and a second electrical connection (not shown) is made at the terminal 68 on the terminal plate 20. These two electrical connections are coupled to a controlled voltage source (not shown).

In operation, when an ambient temperature in the fresh food compartment is sensed by a sensor (e.g., a thermostat or thermistor) as being above the set point or desired temperature, the temperature control circuitry commands the system 10 of the present invention to open the damper door. This command applies a voltage signal to one of the two terminals 64, 68 (with the other of the two acting as an electrical return). The voltage drop between the two terminals 64, 68 causes a current to flow through the heating element 22 (i.e., activates the heating element). As explained above, in embodiments that utilize PTC heating elements, the temperature rises very rapidly to its pre-set temperature.

The heat produced by the heating element 22 is conductively transferred at the second end 54, through the back plate 56, to the fluid in the temperature responsive unit 18. As this heat is transferred to the bellows, the refrigerant is quickly transitioned to a gaseous state (if currently in a liquid state) and expands. The rapidly expanding gas causes the temperature responsive unit 18 to expand in response thereto.

The expanded temperature responsive unit 18 engages the rear portion 28 of the load member 16 until the load member 16 begins to move forward towards the damper door 14. When the temperature responsive unit 18 expands and generates enough force to overcome the bias of the resilient member 44, the damper door 14 is forced open. With the damper door 14 in an open position, colder air from the first compartment flows through the passageway to the second compartment. By permitting the colder air to be transferred in this fashion, the temperature in the second compartment is lowered to a desired ambient temperature.

Advantageously, once the bellows have expanded due to the heat applied to the refrigerant via the heating element 22, the voltage signal applied to the terminals 64, 68 may be removed. The heated and expanded gas in the bellows will generally maintain the damper door 14 in the open position without continuous energization of the heating element 22 (although voltage may need to be sporadically and/or periodically applied to maintain the open state). This minimizes the power consumption of the damper control 10. With the heating element 22 turned off, the refrigerant in the temperature responsive unit 18 begins to cool as the temperature in the fresh food compartment begins to fall. This causes the refrigerant to begin to condense such that the temperature responsive unit 18 begins to deflate and/or contract.

As the temperature responsive unit 18 continues to contract, the force of the resilient member 44 begins to overcome the force exerted on the damper door 14 by the load member 16. Eventually, the force of the load member 16 is completely counteracted by the resilient member 44 and the damper door 14 is biased shut. As such, the flow of colder air through the passageway from the first compartment to the second compartment is discontinued.

Since the damper 10, as above described, is electrically activated via a rapid heating element, the damper can be precisely controlled to fully open when the sensed temperature has risen above the desired set point. Moreover, since the damper 10 employs a temperature responsive unit 18 such as a bellows, the damper provides a low-cost, energy efficient, high-force, and reliable actuation source that does not require continued energization to keep the damper door 14 open until the temperate in the fresh food compartment falls. Thus, the damper 10 combines the advantages of both refrigerant and motorized dampers that are known in the art without the associated disadvantages of either.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be preformed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A damper in a refrigeration system having a first compartment and a second compartment connectable through a passageway, the damper comprising:
    a damper door moveable between an open position and a closed position;
    a temperature responsive unit operatively coupled to the damper door;
    a heating element coupled to one end of the temperature responsive unit to conductively heat the temperature responsive unit when activated; and
    wherein the temperature responsive unit expands to move the damper door to the open position in response to conductive heating from the heating element.

2. The damper of claim 1, wherein the temperature responsive unit is a gas-charged bellows.

3. The damper of claim 1, wherein the temperature responsive unit is operatively coupled to the damper door via a load member.

4. The damper of claim 1, wherein the temperature responsive unit contracts when the heating element is not activated and the temperature responsive unit is permitted to cool.

5. The damper of claim 1, wherein the damper further comprises a resilient member coupled to the damper door, the resilient member biasing the damper door to a closed position.

6. The damper of claim 5, wherein the resilient member is a spring having a spring force sufficient to move the damper door to a closed position when the heating element is not activated and the temperature responsive unit is permitted to cool.

7. The damper of claim 1, wherein the heating element is a ceramic heating element.

8. The damper of claim 1, wherein the heating element is a positive temperature coefficient (PTC) heating element.

9. The damper of claim 1, wherein the temperature responsive unit is fixed at a first end to which the heating element is in contact, the temperature responsive unit having a second end linearly moveable relative to the first end to move the damper door between the open and closed positions.

10. The damper of claim 9, further comprising a back plate affixed to the first end, and a terminal plate, the heating element interposed between and in intimate contact with each of the back plate and the terminal plate.

11. The damper of claim 10, wherein each of the back plate and the terminal plate are electrically conductive.

12. The damper of claim 1, wherein the damper door is linearly slideable between the open and the closed positions.

13. The damper of claim 1, wherein the damper door is pivotable between the open and the closed positions.

14. A damper assembly, comprising:
a housing;
a damper door disposed in the housing, the damper door moveable within the housing between an open and a closed position;
a temperature responsive unit disposed in the housing, the temperature responsive unit having a first end in thermal communication with a back plate and a second end operatively coupled to the damper door;
a terminal plate disposed in the housing and in spaced relation to the back plate; and
a resistive heating element disposed in the housing, the resistive heating element interposed between and in electrical communication with each of the back plate and the terminal plate and in thermal communication with the back plate; and
wherein the temperature responsive unit is operative to move the damper door from the closed position to the open position rapidly upon energization of the resistive heating element.

15. The damper of claim 14, wherein the temperature responsive unit holds the damper door in the open position for a period after the resistive heating element is de-energized to allow the temperature responsive unit to cool and contract thus permitting the damper door to close.

16. The damper of claim 14, wherein the resistive heating element is a positive temperature coefficient (PTC) heater.

17. A damper in a refrigeration system having a first compartment and a second compartment connectable through a passageway, the damper comprising:
a housing;
a damper door disposed in the housing, the damper door moveable to open and to close the passageway;
a gas-charged bellows disposed in the housing, the gas-charged bellows adapted to expand when heated;
a load member operatively coupled between the gas-charged bellows and the damper door;
a back plate disposed in the housing and abutting the gas-charged bellows; and
a positive temperature coefficient (PTC) heater in contact with the back plate; and
wherein the PTC heater conductively heats the gas-charged bellows through the back plate when activated, the gas-charged bellows expanding to transition the load member to bias the damper door open to permit cold air from the first compartment to flow into the second compartment through the passageway.

18. The damper of claim 17, wherein the PTC heater, the back plate, the gas-charge bellows, and the load member are axially aligned.

19. The damper of claim 17, wherein the gas-charged bellows holds the damper door in the open position for a period after the resistive heating element is de-energized.

20. The damper of claim 17, further comprising a resilient member coupled between the housing and the damper door to bias the damper door to the closed position, and wherein the gas-charged bellows holds the damper door in the open position until the gas-charged bellows cools and deflates permitting the resilient member to retract the load member and the damper door to close the passageway such that cold air from the first compartment is restricted from flowing into the second compartment through the passageway.

* * * * *